United States Patent
Onda et al.

(10) Patent No.: US 8,398,116 B2
(45) Date of Patent: Mar. 19, 2013

(54) VEHICLE AIRBAG AND METHOD OF MANUFACTURING THE SAME

(75) Inventors: Kazuhiro Onda, Utsunomiya (JP); Nobuhiro Kawamoto, Shioya-gun (JP); Itaru Genpei, Shioya-gun (JP); Makoto Uchikawa, Utsunomiya (JP); Takashi Kikuchi, Sakura (JP); Yukio Hiruta, Utsunomiya (JP); Yuichi Saito, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 111 days.

(21) Appl. No.: 13/003,952

(22) PCT Filed: Jul. 16, 2009

(86) PCT No.: PCT/JP2009/062924
§ 371 (c)(1),
(2), (4) Date: Jan. 13, 2011

(87) PCT Pub. No.: WO2010/008060
PCT Pub. Date: Jan. 21, 2010

(65) Prior Publication Data
US 2011/0109071 A1    May 12, 2011

(30) Foreign Application Priority Data
Jul. 17, 2008   (JP) .................. 2008-186028

(51) Int. Cl.
*B60R 21/16* (2006.01)

(52) U.S. Cl. .................................................. 280/743.1
(58) Field of Classification Search ............... 280/730.2, 280/743.1; 29/428
See application file for complete search history.

(56) References Cited

U.S. PATENT DOCUMENTS

| | | | | |
|---|---|---|---|---|
| 5,632,506 A | * | 5/1997 | Shellabarger | 280/743.1 |
| 5,664,805 A | * | 9/1997 | Yoshida et al. | 280/743.1 |
| 6,065,772 A | * | 5/2000 | Yamamoto et al. | 280/743.1 |
| 6,364,348 B1 | * | 4/2002 | Jang et al. | 280/730.2 |
| 6,578,866 B2 | * | 6/2003 | Higashi | 280/728.2 |
| 2006/0012155 A1 | * | 1/2006 | Shaner et al. | 280/730.2 |
| 2006/0220358 A1 | * | 10/2006 | Umehara | 280/730.2 |

FOREIGN PATENT DOCUMENTS
JP   2006-281968   10/2006

* cited by examiner

Primary Examiner — Paul N Dickson
Assistant Examiner — Robert A Coker
(74) Attorney, Agent, or Firm — Rankin, Hill & Clark LLP

(57) ABSTRACT

An airbag for a vehicle, the airbag formed as a bag body by sewing together a base cloth, wherein the bag body is configured so that a direction in which the bag body unfolds expands from a base end side of the bag body to a tip end side, and, the bag body includes a tensional force providing mechanism generating a tensional force pulling an upper rim of the bag body toward an outer side by forming a tension line extending so as to cross with the direction in which the bag body unfolds, along a side surface of the bag body.

12 Claims, 8 Drawing Sheets

VEHICLE AIRBAG AND METHOD OF MANUFACTURING THE SAME

TECHNICAL FIELD

The present invention relates to a vehicle airbag and a method of manufacturing the same.

The present application claims priority on Japanese Patent Application No. 2008-186028, filed Jul. 17, 2008, the content of which is incorporated by reference.

BACKGROUND ART

A vehicle airbag device usually includes a folded airbag and an inflator emitting a gas to unfold/expand the airbag.

According to the vehicle airbag, an airbag aiming a boxed shape is known (see, for example, Patent Document 1) such that, in order to ensure an impact absorbing stroke with respect to a passenger when the airbag unfolds, a first base cloth positioned at a side contacting the passenger, a second base cloth facing the first base cloth and positioned at a side being distanced from the passenger compared to the first base cloth, and a third base cloth connecting an outer circumferential rim of the first base cloth and an outer circumferential rim of the second base cloth are sewn together, wherein the impact absorbing stroke is retained by the third base cloth at the time of unfolding.

PRIOR ART DOCUMENT

Patent Document

[Patent Document 1] Japanese Unexamined Patent Application, First Publication No. 2006-281968

DISCLOSURE OF INVENTION

Problems to be Solved by the Invention

According to the conventional vehicle airbag, an impact absorbing stroke is retained by the third base cloth at the time of unfolding, thereby aiming that the shape in an unfolded condition be a boxed shape. However, when gas is injected into the airbag, and an unfolding is actually made, a central portion of the third base cloth bulges towards the outer side due to an increase in the inner pressure of the airbag. At the same time, a connecting portion between the third base cloth and the first base cloth or the second base cloth becomes blunt without being angular. As a result, there is a problem in that the thickness of the airbag decreases, and the expected impact absorbing stroke cannot be obtained. Further, there is also a problem in that an output of the inflator emitting the gas cannot be effectively used to expand the airbag in the thickness direction.

Accordingly, an object of the present invention is to provide a vehicle air bag and a method manufacturing the vehicle airbag so that an impact absorbing stroke may be expanded.

Means for Solving the Problems

In order to achieve the above object, a vehicle airbag according to the present invention employs the following.

(1) An airbag for a vehicle according to an aspect of the present invention is formed as a hag body by sewing together a base cloth. Here, the bag body is configured so that a direction in which the bag body unfolds expands from a base end side of the bag body to a tip end side, and, the bag body includes a tensional force providing mechanism generating a tensional force pulling an upper rim of the bag body toward an outer side by forming a tension line extending so as to cross with the direction in which the bag body unfolds, along a side surface of the bag body.

By being configured as described above, the tensional force providing mechanism allows an upper rim of the bag body to be pulled over toward an outer side of a thickness direction of the bag body, when the bag body unfolds or expands. In this way, it is possible to enlarge the thickness (for example, the thickness in the vehicle width direction in case of a side airbag) when the bag body expands.

(2) An airbag for a vehicle described in (1) above may be configured as follows: compared to a lineal length connecting a first fixed point on an upper rim of the side surface of the bag body and a second fixed point at a base end side of the bag body existing on an imaginary line along the direction in which the bag body unfolds passing through the first fixed point, a lineal length connecting the first fixed point and a tensional force origin point placed being distanced from the second fixed point at the base end side of the bag body is set to be longer. Thus, the tension line is formed to connect the tensional force origin point and the first fixed point, thereby configuring the tensional force providing mechanism.

By being configured as described above, it is possible to form an effective tensional force providing mechanism according to the shape of a side surface of the bag body. In this way, it is possible to enlarge the thickness (for example, the thickness in the vehicle width direction in case of a side airbag) when the bag body expands.

(3) An airbag for a vehicle described in (2) above may be configured as follows: the tensional force origin is positioned lower than the second fixed point.

By being configured as described above, a tensional force generated by the tensional force providing mechanism acts so as to pull over the first fixed point toward an outer side in the width direction of the bag body and towards a lower side. In this way, it is possible to enlarge the thickness (for example, the thickness in the vehicle width direction in case of a side airbag) when the bag body expands.

(4) An airbag for a vehicle described in (2) above may be configured as follows: the tensional force origin is positioned higher than the second fixed point.

By being configured as described above, a tensional force generated by the tensional force providing mechanism acts so as to pull over the first fixed point toward an outer side in the width direction of the bag body and towards a higher side. In this way, it is possible to enlarge the thickness (for example, the thickness in the vehicle width direction in case of a side airbag) when the bag body expands.

(5) An airbag for a vehicle according to another embodiment of the present invention is formed as a bag body by sewing together a periphery of a polymerized base cloth, wherein a pair of folding parts is polymerized, the pair of folding parts being provided on at least towards a side of the base cloth before sewing together, and the airbag comprises a connection part formed by sewing together tip ends of the folding part, and a shape restriction part formed by bonding a base part of the folding part along its folding line.

By being configured as described above, the shape restriction part restricts the bending part from bulging outwards when the bag body is expanding. As a result, it is possible to prevent the thickness of the bag body (for example, the thickness in the vehicle width direction in case of a side airbag) from decreasing at the time of an expansion. In addition, an inner pressure (an expansion pressure) of the bag body, which increases during an unfolding, may be effectively utilized to expand the bag body in the thickness direction (for example, the direction in the vehicle width in case of a side airbag).

(6) An airbag for a vehicle described in (5) above may be configured as follows: the folding part is provided on each of an upper side and a lower side of a base cloth before sewing together, and the connection part and the shape restriction part is provided on respectively each bending part of the upper side and each bending part of the lower side, being polymerized, and wherein a height dimension of the bending part of the upper side is larger than a height dimension of the bending part of the lower side.

By being configured as described above, the thickness of the bag body at the time of an expansion may be made larger at an upper side compared to a lower side.

(7) An airbag for a vehicle described in (5) above may include a second shape restriction part formed by bonding along a direction extending toward an inner side of the bag body and crossing with respect to the shape restriction part.

By being configured as described above, the second shape restriction part may also restrict the folding part from bulging outwards when the bag body expands.

(8) An airbag for a vehicle described in either one of (6) or (7) above may be configured as follows: a vent hole is formed at a position at an upper part of the base cloth and oriented toward a front of a direction in which the bag body is unfolded when the bag body has expanded.

By being configured as described above, it is possible to stabilize the shape of the vent hole when the bag body expands.

(9) An airbag for a vehicle described in either one of (6) or (7) above may be configured as follows: a reinforcing cloth is provided at a peripheral rim of the vent hole.

By being configured as described above, it is possible to further stabilize the shape of the vent hole when the bag body expands.

(10) A manufacturing method of an airbag for a vehicle according to an aspect of the present invention includes: a step forming a base cloth which is approximately symmetrically shaped; a step bending the base cloth at a central part and sewing together a peripheral rim; a step turning over inside-out, a base cloth, the peripheral rim of which has been sewed together; and a step bonding along the bending line in a condition in which at least an end of the base cloth being turned over inside-out, is bended to an inner side.

According to this manufacturing method, an airbag for a vehicle described in (5) above may be manufactured easily from a piece of base cloth. Therefore, the productivity is enhanced.

(11) A manufacturing method of an airbag for a vehicle described in (10) above may further include a step sewing a reinforcing cloth comprising a vent hole to a central part of the base cloth which is approximately symmetrically shaped.

By configuring as described above, it is possible to easily manufacture an airbag for a vehicle including a vent hole exhibiting a stable gas emission characteristic.

Effects of the Invention

According to the invention described in (1) above, when a bag body expands, a thickness (for example, a thickness in a vehicle width direction in the case of a side airbag) may be enlarged. Therefore, a substantive impact absorption stroke is increased.

According to the invention described in (2) above, an effective tension providing mechanism according to the shape of a side surface of a bag body may be easily formed. As a result, the degree of freedom with which the shape of the vehicle airbag and the like is designed increases.

According to the invention described in (3) above, in an embodiment of a bag body such that an origin of the tensional force is placed lower than the second fixed point, it is possible to increase a substantive impact absorption stroke.

According to the invention described in (4) above, in an embodiment of a bag body such that an origin of the tensional force is placed higher than the second fixed point, it is possible to increase a substantive impact absorption stroke. Further, the manufacturing of the vehicle air bag becomes easier.

According to the invention described in (5) above, when the bag body expands, a shape restriction part restricts a fold-back portion from expanding outwards. Thus, the thickness of the bag body (for example, a thickness in the vehicle width direction in the case of a side airbag) at the time of the expansion is prevented from decreasing. Therefore, a substantive impact absorption stroke is increased. In addition, the inner pressure (the expansion pressure) of the bag body, which increases at the time of the unfolding, may be used effectively to expand the bag body in a thickness direction (for example, in a direction of the vehicle width in the case of a side airbag).

According to the invention described in (6) above, the thickness of the bag body at the time of the expansion may be enlarged at the upper side compared to the lower side. As a result, in the case of an airbag of a side airbag device, the impact absorption stroke with respect to the chest portion of the passenger may be increased.

According to the invention described in (7) above, when the bag body expands, a second shape restriction part may also restrict a fold-back portion from expanding outwards. Thus, the thickness of the bag body (for example, a thickness in the vehicle width direction in the case of a side airbag) at the time of the expansion is reliably prevented from decreasing.

According to the invention described in (8) or (9) above, when the bag body expands, the shape of the vent hole may be stabilized. Thus, the vent hole may exhibit a stable gas emission characteristic.

According to the invention described in (10) above, a vehicle airbag described in (5) may be easily manufactured from a piece of base cloth. Therefore, the productivity increases.

According to the invention described in (11) above, it is possible to easily manufacture a vehicle airbag comprising a vent hole exhibiting a stable gas emission characteristic.

EMBODIMENTS FOR CARRYING OUT THE INVENTION

Hereunder, an embodiment of a vehicle airbag according to the present invention is described with reference to FIG. 1 to FIG. 14. Incidentally, the vehicle airbag according to the embodiment described below is configured as an airbag of a side airbag device.

Figure 1:
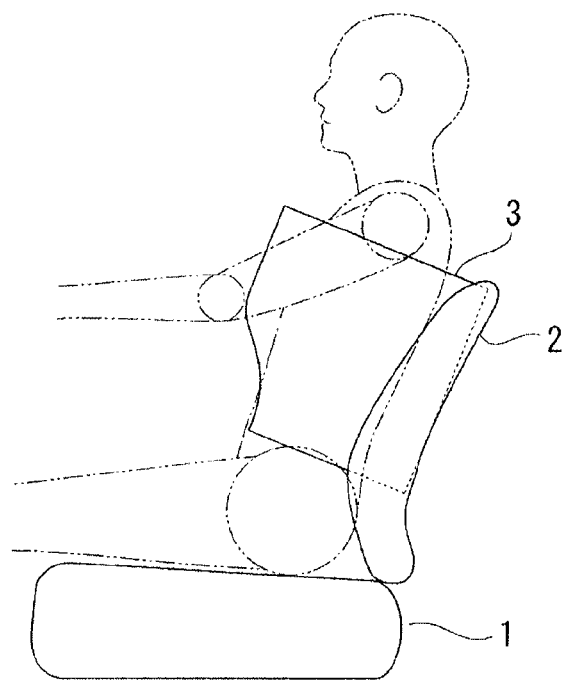
FIG. 1 is a side view showing a side airbag device comprising an airbag according to a first embodiment of the present invention when the airbag is unfolded/expanded.

First, an airbag according to a first embodiment is described. The side airbag device according to the first embodiment is stored in a side rim part of a door side of a seat back with respect to a driving seat and a passenger seat of a vehicle. As shown in FIG. 1, the side airbag device according to the first embodiment comprises an airbag 3 such that, when an impact is inputted during a side surface collision and the like, the airbag 3 absorbs the impact to the passenger by unfolding/expanding between the passenger and a side part of a vehicle body from a side part of a seatback 2 of the seat 1.

Figure 2:
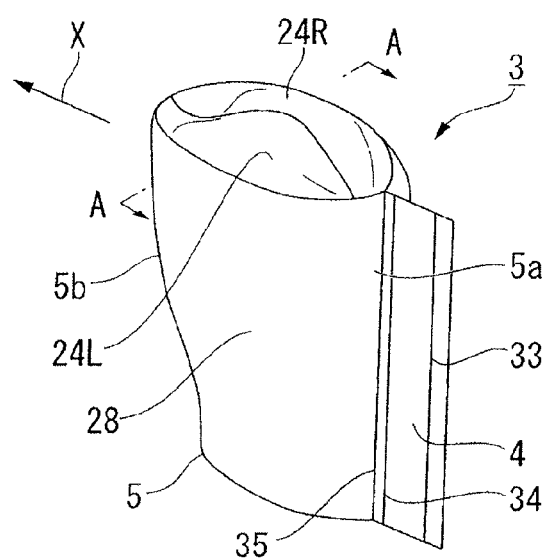
FIG. 2 is an external perspective view when an airbag according to a first embodiment is unfolded/expanded.

FIG. 2 is a perspective view of an airbag 3 when the airbag 3 is unfolded/expanded by a gas emitted by an inflator, seen from an obliquely upward side of a rear side of a vehicle. Incidentally, the arrow X in FIG. 2 indicates a direction in which the airbag 3 is unfolded. The vehicle rear side of the airbag 3 is referred to as a holding part 4, while the vehicle frontal side of the airbag 3 is referred to as a bag main body part 5. An inflator (not diagrammed) is stored in the holding part 4. At the same time, the holding part 4 is fixed to the frame (not diagrammed) of the seat back 2. The bag main body part 5 is folded in a predetermined manner and is stored inside a seat bag 2. The bag main body part 5 is unfolded/expanded by a gas emitted by an inflator when an impact is inputted.

Figure 3:
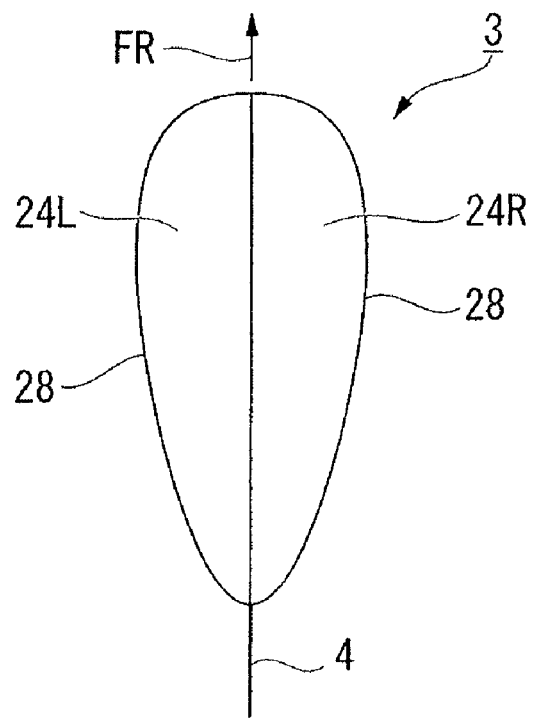
FIG. 3 is a planar view when an airbag according to a first embodiment is unfolded/expanded.

The bag main body part 5 at the time of expansion is configured so that a dimension of an upper side is greater than a dimension of a lower side, with respect to a longitudinal direction of the vehicle, and so that the dimension in the vehicle width direction (thickness) is large. In addition, as shown in FIG. 3, the dimension in the vehicle width direction (thickness) is larger at the frontal side of the vehicle compared to the rear side of the vehicle. Incidentally, in FIG. 3, the arrow FR indicates a frontal direction of the vehicle.

This airbag 3 is basically comprised of one piece of base cloth. Hereinafter, a manufacturing method of the airbag 3 is described.

Figure 5:
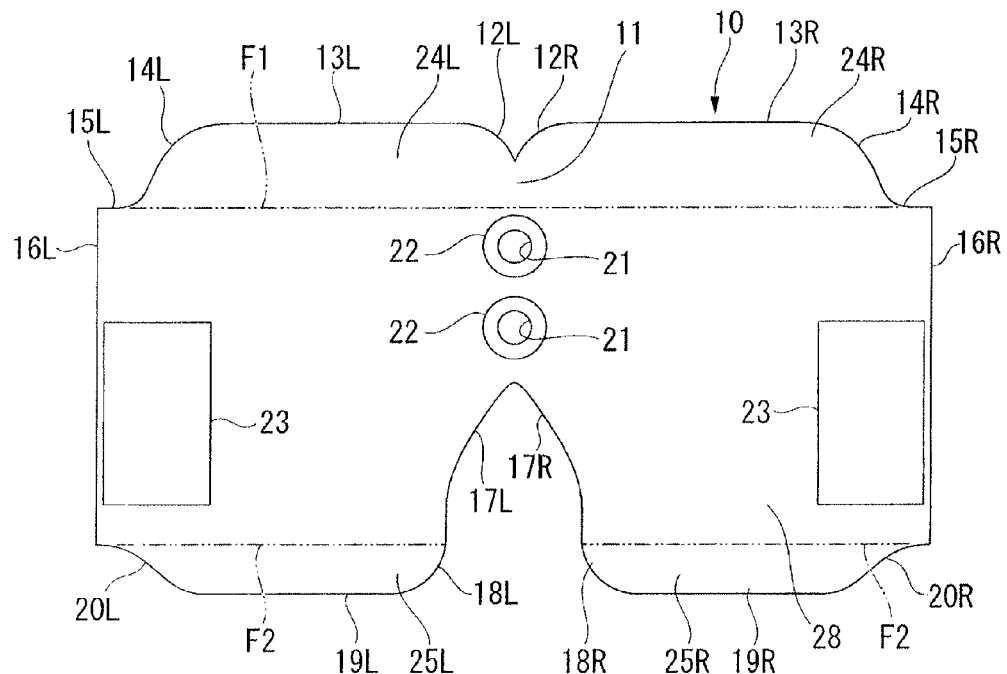
FIG. 5 is a development view of a base cloth before an airbag according to a first embodiment is sewn together, and is a diagram showing a first process in a manufacturing method of an airbag.

First, in the first step, as shown in FIG. 5, one piece of symmetrical base cloth 10 is prepared. The base cloth 10 is symmetrical with respect to the central part 11. At the central part 11, the dimension in the upper and lower direction is the smallest in FIG. 5. At the same time, the central part 11 is positioned towards an upper side. The upper end of the central part 11 connects to the left and right upper side parts 13L, 13R via the R parts 12L, 12R. The left and right ends of the upper side parts 13L, 13R are connected to the upper end of the left side part 16L and the right side part 16R via the curved parts 14L, 14R each having a predetermined shape and via the straight line parts 15L, 15R. Meanwhile, the lower end of the central part 11 connects to the left and right lower side parts 19L, 19R via the slanted side parts 17L, 17R and the R parts 18L, 18R. The slanted side parts 17L, 17R are slanted so as to move away from each other as one proceeds downwards in FIG. 5. The left and right end of the lower side parts 19L, 19R each connect to the lower ends of the left side part 16L and the right side part 16R via the curved parts 20L, 20R each having a predetermined shape. Incidentally, both the upper side parts 13L, 13R and the lower side parts 19L, 19R form a straight line extending in the left and right directions in FIG. 5. In FIG. 5, the left side part 16L and the right side part 16R each form a straight line extending in the upper and lower directions in FIG. 5.

Two vent holes 21 are formed in the central part 11 of the base cloth 10 aligned in the upper and lower direction in FIG. 5. A ring-shaped reinforcing cloth 22 is bonded around the vent hole 21 via a predetermined procedure such as adhesive bonding.

In addition, a reinforcing cloth 23 comprised of a rectangular flameproof cloth is bonded to a corner part of the base cloth 10 near the left and right side parts 16L, 16R and the curved parts 20L, 20R by way of a predetermined procedure such as adhesive bonding.

Incidentally, according to the base cloth 10, an imaginary line connecting the upper ends of the left and right side parts 16L, 16R becomes an upper side folding line F1 which is described later. A section at an upper side of the upper side folding line F1 becomes a pair of left and right upper side folding parts 24L, 24R. Incidentally, according to the base cloth 10, an imaginary line connecting the lower ends of the left and right side parts 16L, 16R becomes a lower side folding line F2 which is described later. A section at a lower side of the lower side folding line F2 becomes a pair of left and right lower side folding parts 25L, 25R. The height dimension of the upper side folding parts 24L, 24R (the dimension in the upper and lower direction in FIG. 5) is set to be greater than the height dimension of the lower side folding parts 25L, 25R (same as described above).

Incidentally, for purposes of the description provided below, a section between the upper side folding line F1 and the lower side folding line F2 is referred to as a body part 28.

Figure 6:
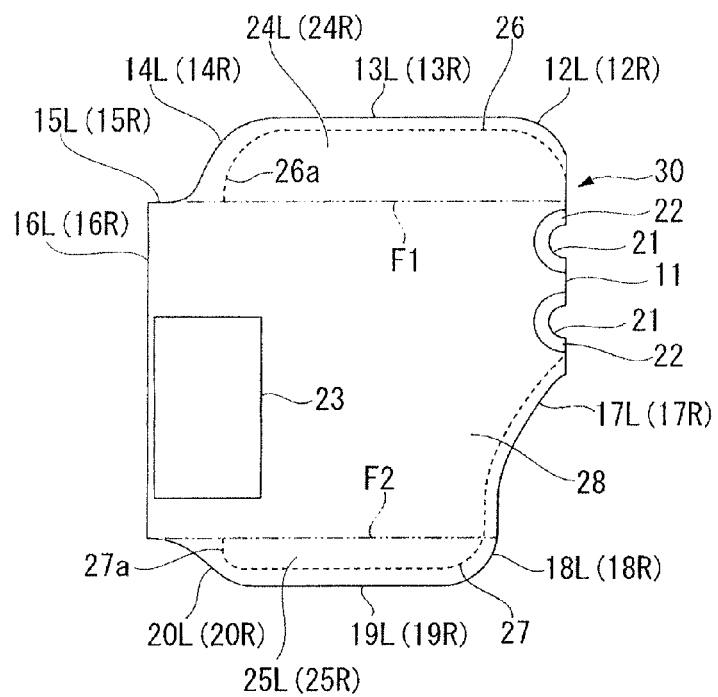
FIG. 6 is a diagram showing a second process in a manufacturing method of the airbag.

Next, in the second step, as shown in FIG. 6, the base cloth 10 folded over with the central part 11 being the center so that the reinforcing cloth 22, 23 becomes the front side. Further, the left side part 16L is overlapped on top of the right side part 16R. The R part 12L, the upper side part 13L, the curved part 14L, the straight line part 15L, the slanted part 17L, the R part 18L, the lower side part 19L, and the curved part 20L at the left side are overlapped on top of the R part 12R, the upper side part 13R, the curved part 14R, the straight line part 15R, the slanted part 17R, the R part 18R, the lower side part 19R, and the curved part 20R at the right side. As a result, the right upper side folding part 24R overlaps with the left upper side folding part 24L. Further, the right lower side folding part 25R overlaps with the left lower side folding part 25L.

Furthermore, as indicated in FIG. 6 with a dashed line, the bag body 30 is formed by sewing together the overlapped base cloth 10 along the R parts 12L, 12R, the upper side parts 13L, 13R, and the curved parts 14L, 14R while, at the same time, sewing together the overlapped base cloth 10 along the slanted parts 17L, 17R, the R parts 18L, 18R, and the lower side parts 19L, 19R. In this way, an upper side connected portion 26 is formed by sewing together the tips of the right upper side folding part 24R and the left upper side folding part 24L. Further, a lower side connected portion 27 is formed by sewing together the tips of the right lower side folding part 25R and the left lower side folding part 25L. However, the end 26a of the upper side connected portion 26 along the curved lines 14L, 14R is configured to intersect perpendicular to the upper side folding line F1. The end 27a of the lower side connected portion 27 along the lower side parts 19L, 19R is configured to intersect perpendicular to the lower side folding line F2. The ends 26a and 27a are positioned so as to be distanced from the left and right side parts 16L, 16R by approximately the same dimension.

Once this second step is completed, a portion at the side of the left and right side parts 16L, 16R is not yet sewn, and is therefore opened.

Figure 7:
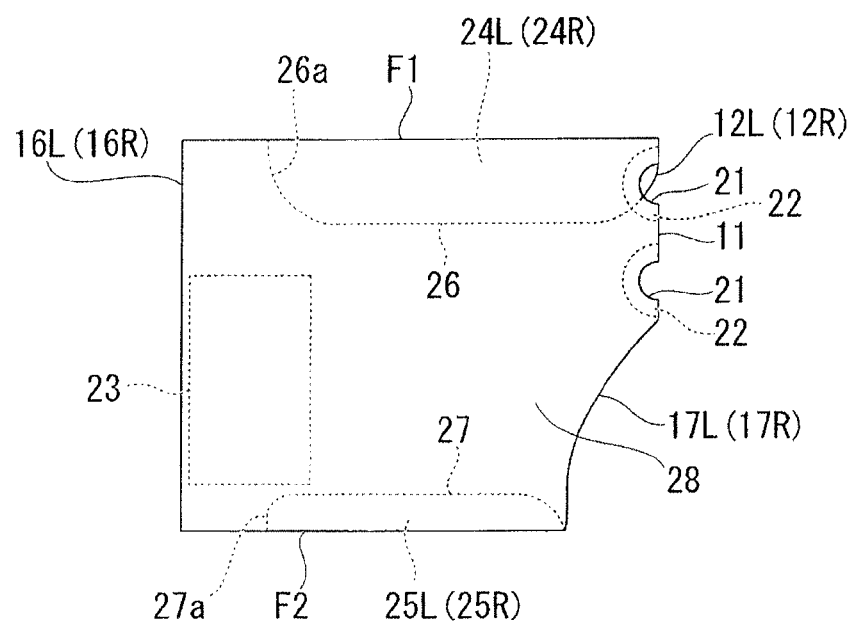
FIG. 7 is a diagram showing a third process in a manufacturing method of the airbag.

Next, in the third step, the opening at the portion at the side of the left and right side parts 16L, 16R, which is not yet sewn, is utilized to turn the sewn base cloth 10 (i.e. the bag body 30) inside out. Furthermore, as shown in FIG. 7, the upper side folding parts 24L, 24R are folded over towards the inner side of the bag body 30 along the upper side folding line F1. At the same time, the lower side folding parts 25L, 25R are folded over towards the inner side of the bag body 30 along the lower side folding line F2.

Figure 8:
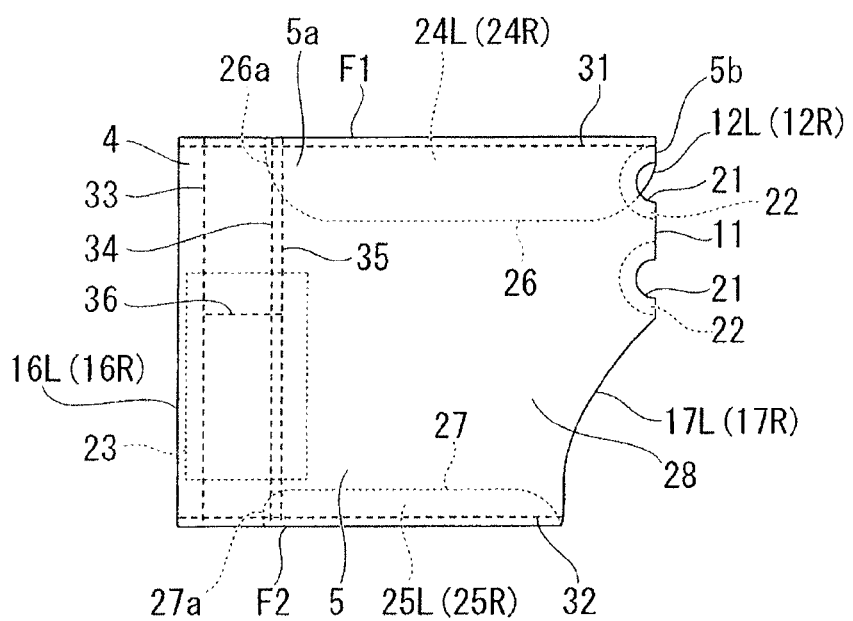
FIG. 8 is a diagram showing a fourth process in a manufacturing method of the airbag.

Next, in the fourth step, as shown in FIG. 8, the left upper side folding part 24L and the body part 28 are sewn together along a slightly lower side of the upper side folding line F1. An upper side shape restriction part 31 is formed by sewing together the right upper side folding part 24R and the body part 28. Further, the body parts 28 overlapping along an extended line of the upper side shape restriction part 31 until the reaching of the left and right side parts 16L, 16R are sewn together.

Similarly, the left lower side folding part 25L and the body part 28 are sewn together along a slightly upper side of the lower side folding line F2. A lower side shape restriction part 32 is formed by sewing together the right lower side folding part 25R and the body part 28. Further, the body parts 28 overlapping along an extended line of the lower side shape restriction part 32 until the reaching of the left and right side parts 16L, 16R are sewn together.

Furthermore, the bag body 30 is sewn together in its entirety along three straight lines along an upper and lower direction orthogonal to the upper side folding line F1 and the lower side folding line F2. At the same time, a sewing up is made at a lateral sewing pad 36 so that approximately a central part of the three sewing parts 33, 34, and 35 are connected.

The sewing part 33 is placed in proximity to the left and right side parts 16L, 16R. The sewing parts 34, 35 are placed by being separated by a predetermined measurement from the sewing part 33. The sewing parts 34, 35 are proximate to each other. Both the sewing parts 34 and 35 are placed closer to the central part 11 compared to the end 26a of the upper side connected portion 26 and the end 27a of the lower side connected portion 27. Further, the sewing parts 33, 34, and 35 all traverse the reinforcing cloth 23 longitudinally. The lateral sewing part 36 is placed at a position corresponding to the upper part of the reinforcing cloth 23. As a result of being sewn together by the sewing parts 33, 34, and the lateral sewing part 36, a section between the two reinforcing cloths 23 and 23 becomes a tubular bag. An inflator is attached inside this bag.

Incidentally, the sewing part 35 formulates a second shape restriction part intersecting diagonally with respect to the upper side shape restriction part 31 and the lower side shape restriction part 32 and extending towards the inner side of the bag body 30.

Here, a portion towards the left and right side parts 16L, 16R compared to the sewing part 35 becomes the above-mentioned holding part 4. Meanwhile, a portion towards the central part 11 compared to the sewing part 35 becomes the above-mentioned bag main body part 5. Incidentally, for ease of explanation below, according to the airbag 3 which is completed by being sewn together in an embodiment indicated in FIG. 8, a portion adjacent to the sewing part 35 is referred to as the base end side 5a of the bag main body part 5. A portion in which the vent hole 21 is provided is referred to as the tip end side 5b of the bag main body part 5.

Incidentally, the sewing parts 34, 35 comprise a non-sewing part (not diagrammed) inside the reinforcing cloth 23. A gas outlet (not diagrammed) of the inflator is attached to the non-sewing part. In this way, gas may be filled into the bag main body part 5.

The airbag 3 configured as described above is stored inside the seat back 2 in an embodiment such that the bag main body part 5 is folded in a predetermined manner from an embodiment shown in FIG. 8. The holding part 4 is retained by the frame (not diagrammed) of the seat back 2 along the entire length in its upper and lower direction.

Further, when an inflator emits gas when an impact is inputted at the time of a side surface collision and the like, the gas is filled in from the base end side 5a of the bag main body part 5 and gradually spreads toward the tip end side 5b of the bag main body part 5. As a result, the folded bag main body part 5 expands by being unfolded from the base end side 5a to the tip end side 5b. Further, the bag main body part 5 bursts through the seat back 3, unfolds and expands between the passenger and the side part of the vehicle body, and absorbs the impact on the passenger. In other words, this airbag 3 is configured so that the direction of unfolding of the bag main body part 5 expands from the base end side 5a of the bag main body part 5 to the tip end side 5b.

Further, according to this airbag 3, the thickness in the direction of the vehicle width when the hag main body part 5 expands may be set to be large. This feature is described according to FIGS. 9 and 10. Incidentally, according to FIGS. 9 and 10, the arrow X indicates the direction in which the bag main body part 5 (airbag 3) expands.

Figure 9:
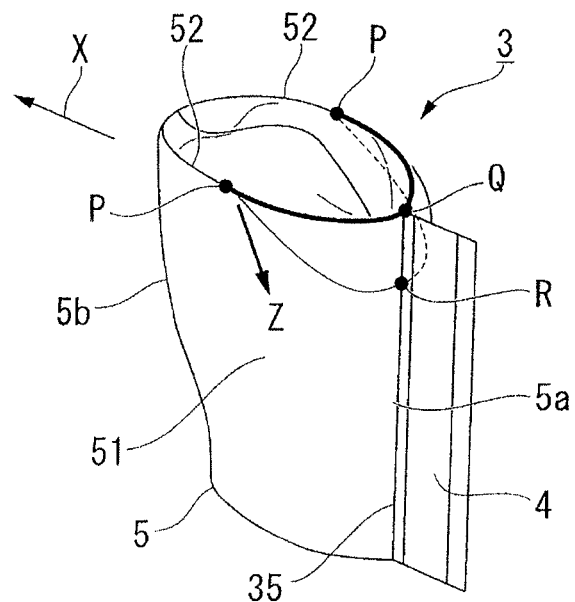
FIG. 9 is a perspective view describing a rationale with which an impact absorption stroke of an airbag according to a first embodiment is augmented.

Similar to FIG. 2, FIG. 9 is a diagram indicating a condition in which the unfolding and expansion of the airbag 3 is completed. According to FIG. 9, point P indicates a maximum bulging point on the upper rim 52 of both side surfaces 51 of the bag main body part 5 which is bulging the most in the vehicle width direction. Point Q is an intersection between an upper rim 52 of both side surfaces 51 of the bag main body part 5 and the holding part 4. Point R is an intersection between the upper rim 52 and the sewing part 35. Incidentally, the upper rim 52 of both side surfaces 51 of the bag main body part 5 comprises the upper side shape restriction part 31. The direction in which the upper rim 52 extends matches with the direction in which the bag main body part 5 unfolds. In addition, the maximum bulging point P is positioned at approximately the center of the upper side shape restriction part 31. Further, point R may be regarded as a base point of a tensional force occurring between the maximum bulging point P. According to this first embodiment, the maximum bulging point P is comprised in the first definite point, point Q is comprised in the second definite point, and point R is comprised in the base point of the tensional force. Incidentally, in the following description, point R may be referred to as a tensional force source R.

Figure 10:
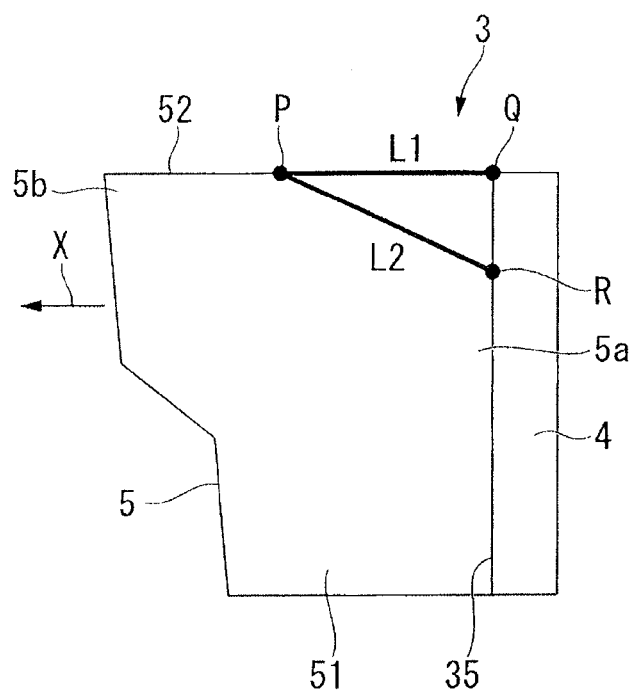
FIG. 10 is a side view describing a rationale with which an impact absorption stroke of an airbag according to a first embodiment is augmented.

FIG. 10 is a skeletal side view seeing the airbag 3 from a side before an unfolding and expansion are completed in a condition in which the pressure inside the bag main body part 5 is low. Points P, Q, and R in FIG. 10 corresponds to points P, Q, and R in FIG. 9. Thus, according to the bag main body part 5 before the unfolding and expansion are completed, the distance L1 between P–Q is small compared to the distance L2 between P–R (L1<L2). A length by which an extension is possible between P–Q is smaller than that of between P–R. Thus, thereafter, when an inner pressure inside the bag main body part 5 increases, and when a force operates to expand the bag main body part 5 in the vehicle width direction, the maximum bulging point P is pulled over to the outer side of the vehicle width direction and to the lower side, as indicated in arrow Z in FIG. 9, and thereby moves. As a result, measurement of the bag main body part 5 in the upper and lower direction is slightly reduced. At the same time, the thickness of the bag main body part 5 in the vehicle width direction increases. Therefore, a substantial impact absorbing stroke of the airbag 3 is enlarged.

According to this first embodiment, the tensional force base point (point R) is placed lower than the second fixed point (point Q). A lineal length (L2) of a line connecting the tensional force base point (point R) and the first fixed point (point P) is set to be longer than a lineal length (L1) of a line connecting the first fixed point (point P) and the second fixed point (point Q). In this way, a tension line is formed so as to connect the tensional force base point (point R) and the first fixed point (point P). In other words, a tension line is formed extending so as to cross with the direction X in which the bag main body part 5 is unfolded. In this way, a tensional force supplying mechanism is configured, which generates a tensional force pulling over the upper rim (upper rim 52) of the bag body (bag main body 5) towards the outer side.

Figure 11:
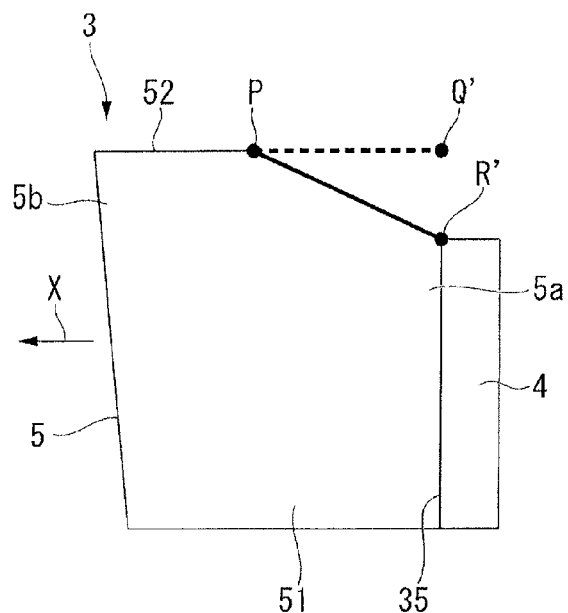
FIG. 11 is a skeletal side view of an airbag according to a comparative example.
Figure 12:
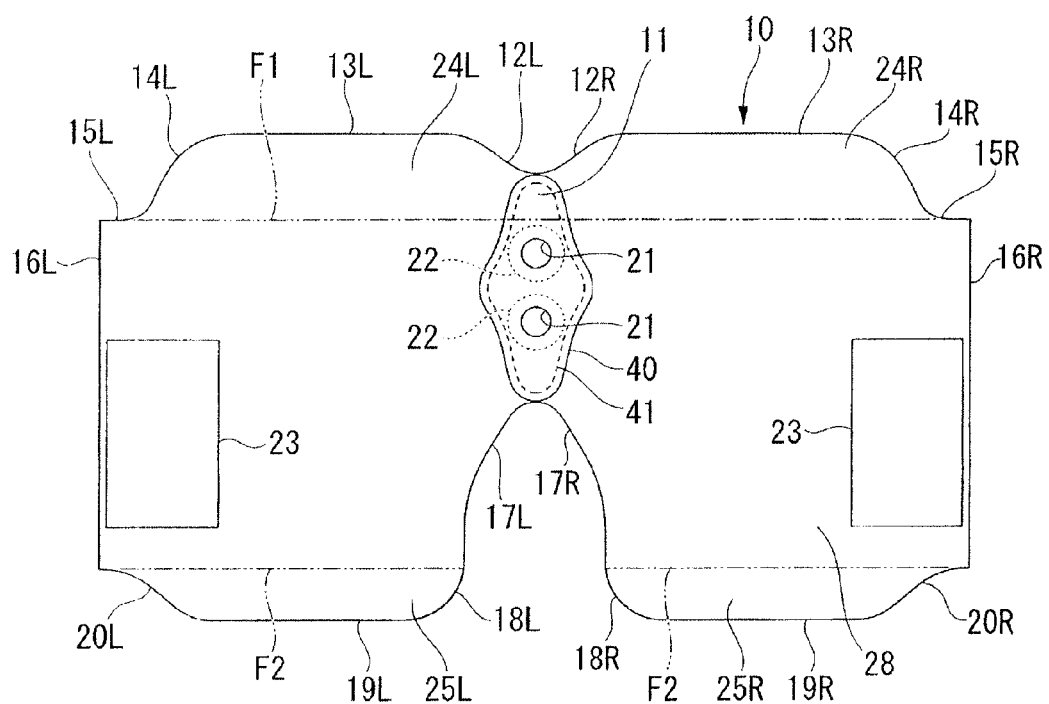
FIG. 12 is a diagram showing a process subsequent to the first process according to another embodiment of an airbag manufacturing method.

FIG. 11 is a diagram corresponding to FIG. 10 in the comparative example. In the diagram, the arrow X indicates the direction in which the bag main body part 5 (the airbag 3) is unfolded. According to the airbag based on the comparative example shown in FIG. 11, the tensional force base point R' is a point at which the upper rim 52 of the side surface 51 of the bag main body part 5 connects the holding part 4. A base cloth does not exist at a portion in the upper side of the line connecting point P and point R'. Incidentally, in FIG. 11, point Q' is an imaginary point corresponding to point Q in FIG. 10. In case of this comparative example, a tensional force does not apply between P–Q'. Therefore, the maximum bulging point P is merely supported by a tensional force applying between the tensional force base point R'. As a result, a force pulling over the maximum bulging point P towards the outer side, as indicated in the first embodiment, is not generated. Therefore, unlike the first embodiment, there is no effect of enlarging the thickness of the bag main body part 5.

Figure 4:
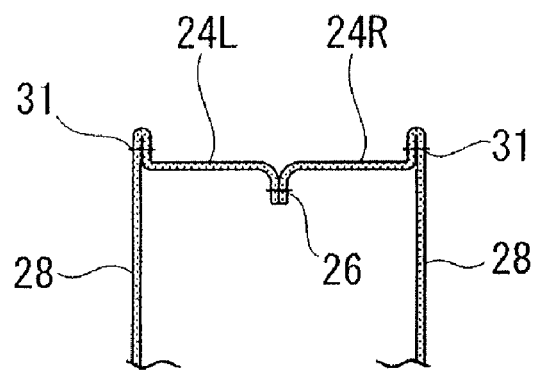
FIG. 4 is a cross sectional view of FIG. 2 with respect to plane A-A.

Further, according to the airbag 3 based on the first embodiment, when the bag main body part 5 unfolds or expands, the upper side shape restriction part 31 restricts the connection part between the upper side folding parts 24L, 24R and the body part 28 from becoming round, and restricts the upper side folding parts 24L, 24R from expanding outwards (upside), as indicated in FIG. 4. As a result, it is possible to restrict the thickness of the upper side part of the bag main body part 5 from decreasing. Thus, a predetermined impact absorbing stroke may be retained at the upper side part of the bag main body part 5 as well.

Similarly, the lower side shape restriction part 32 restricts the connection part between the lower side folding parts 25L, 25R and the body part 28 from becoming round, and restricts the lower side folding parts 25L, 25R from expanding outwards. As a result, it is possible to restrict the thickness of the lower side part of the bag main body part 5 from decreasing. Thus, a predetermined impact absorbing stroke may be retained at the lower side part of the bag main body part 5 as well.

Further, according to the airbag 3 based on this first embodiment, the height measurement (the measurement in the upper and lower direction in FIG. 5) of the upper side folding part 24L, 24R is larger than the height measurement (same as described above) of the lower side folding part 25L, 25R. Therefore, the upper side of the thickness of the bag main body part 5 at the time of the expansion may be enlarged compared to the lower side. As a result, it is possible to increase the impact absorbing stroke with respect to the chest part of the passenger.

Furthermore, since it is possible to restrict the upper side folding part 24L, 24R and the lower side folding part 25L, 25R from bulging outwards, the inner pressure (expansion pressure) of the bag main body part 5, which increases due to the inflator being filled up with gas, may be used effectively to expand the bag main body part 5 in the vehicle width direction. As a result, the thickness of the bag main body part 5 may be enlarged at the time of expansion. In addition, the impact absorbing stroke may be further increased.

Further, a sewing part 35, provided at the rear side of the vehicle with respect to the bag body 30, is extending while crossing with the upper side shape restricting part 31 and the lower side shape restricting part 32. As a result, this sewing part 35 also restricts the upper side folding part 24L, 24R and the lower side folding part 25L, 25R from bulging outwards when the bag main body part 5 expands. Therefore, the bag main body part 5 may be widened in the vehicle width direction at the time of expansion. Further, the impact absorbing stroke may be further increased.

Further, the vent hole 21 is a gas releasing hole to restrict the inner pressure of the bag main body part from increasing more than necessary. This vent hole 21 is provided at a central part 11 of the base cloth 10. This central part 11 is positioned at a front part in a direction of unfolding with which a thickness is ensured when the bag main body part 5 expands. As a result, the shape of the vent hole 21 becomes stable at the time of expansion. Thus, the vent hole 21 may exhibit a stable gas emission characteristic. Further, the reinforcing cloth 22 provided around the vent hole 21 also has the effect of stabilizing the shape of the vent hole 21.

Further, subsequent to the first step described above, as shown in FIG. 12, when a step is added such that another reinforcing cloth 40 is sewn to the base cloth 10 by the sewing part 41, it is possible to better stabilize the shape of the vent hole 21 when the bag main body part 5 expands. Therefore, a more stabilized gas emission characteristic may be exhibited. Here, the another reinforcing cloth 40 has an opening at a portion corresponding to the two vent holes 21, and is obtained by overlapping two reinforcing cloths 22. Further, the another reinforcing cloth 40 covers an area surrounding the center part 11 of the base cloth 10.

Moreover, according to the manufacturing method of the airbag 3 described above, the airbag 3 according to the above-mentioned configuration may be easily manufactured from a piece of base cloth 10. Thus, productivity increases.

Next, a second embodiment of an airbag 3 is described with reference to FIG. 13.

A basic configuration of the airbag 3 according to the second embodiment is the same as that of the first embodiment. The difference between the airbag 3 according to the second embodiment and the airbag 3 according to the first embodiment lies in the positional relationship between the first and second fixed points and the tensional force origin.

Figure 13:
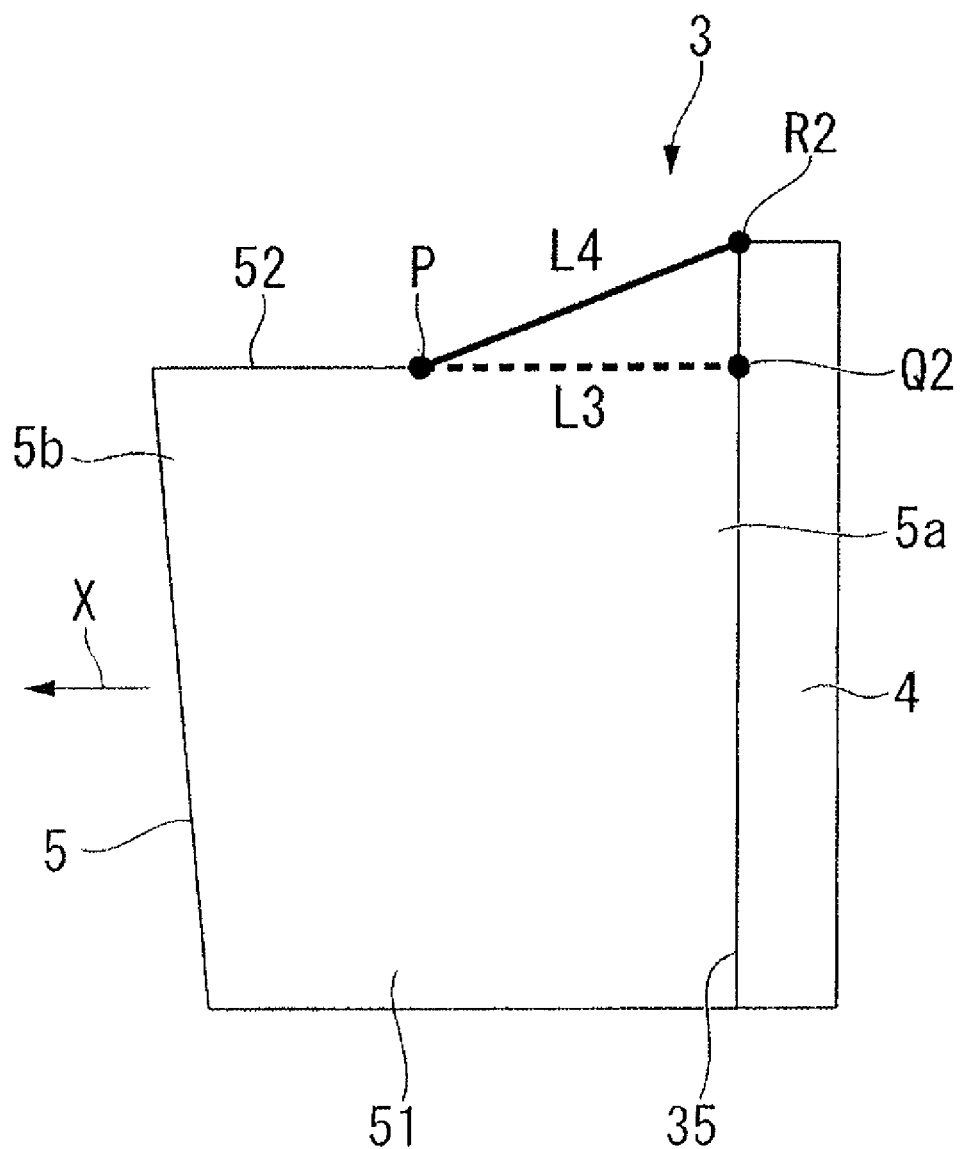
FIG. 13 is a side view describing a rationale with which an impact absorption stroke of an airbag according to a second embodiment is augmented.

FIG. 13 is a skeletal side view of the airbag 3 corresponding to FIG. 10 in the first embodiment. In the figure, the arrow X indicates a direction in which the bag main body part 5 (the airbag 3) unfolds.

According to this FIG. 13, point P is the same as the instance in the first embodiment. Thus, point P represents the maximum bulging point (a first fixed point) on the upper rim 52 of both side surfaces 51 of the bag main body part 5, point Q2 represents a second fixed point at a side of the base end of the bag main body part 5 existing on an imaginary line along the direction of unfolding passing through point P. Point R2 corresponds to point R in the first embodiment. Point R2 is an intersection of the upper rim 52 and the sewing part 35, and is a tensional force base point. Incidentally, according to this second embodiment, the direction in which the upper rim 52 of both side surfaces 51 of the bag main body part 5 extends does not match with the direction in which the bag main body part 5 unfolds.

According to the airbag 3 based on the second embodiment configured as described above, regarding the bag main body part 5 before the unfolding and expansion are completed, the distance L3 between P–Q2 is small compared to the distance L4 between P–R2 (L3<L4). A length by which an extension is possible between P–Q2 is smaller than that of between P–R2. Therefore, hereinafter, when an inner pressure inside the bag main body part 5 increases, and when a force operates to expand the bag main body part 5 in the vehicle width direction, the maximum bulging point P is pulled over to the outer side of the vehicle width direction and to the upper side, and thereby moves. As a result, the thickness of the bag main body part 5 in the vehicle width direction increases. Therefore, a substantial impact absorbing stroke of the airbag 3 is enlarged. Therefore, the airbag 3 provides an effect in the second embodiment which is similar to the effect provided in the first embodiment.

According to the second embodiment, the tensional base point (point R2) is placed higher than the second fixed point (point Q2). A lineal length (L4) of a line connecting the tensional force base point (point R2) and the first fixed point (point P) is set to be longer than a lineal length (L3) of a line connecting the first fixed point (point P) and the second fixed point (point Q2) (L3<L4). In this way, a tension line is formed so as to connect the tensional force base point (point R2) and the first fixed point (point P). In other words, a tension line is formed extending so as to cross with the direction X in which the bag main body part 5 is unfolded. In this way, a tensional force supplying mechanism is configured, which generates a tensional force pulling over the upper rim (upper rim 52) of the bag body (bag main body 5) towards the outer side.

Another Embodiment

Incidentally, the present invention is not limited to the embodiment described above.

Figure 14:
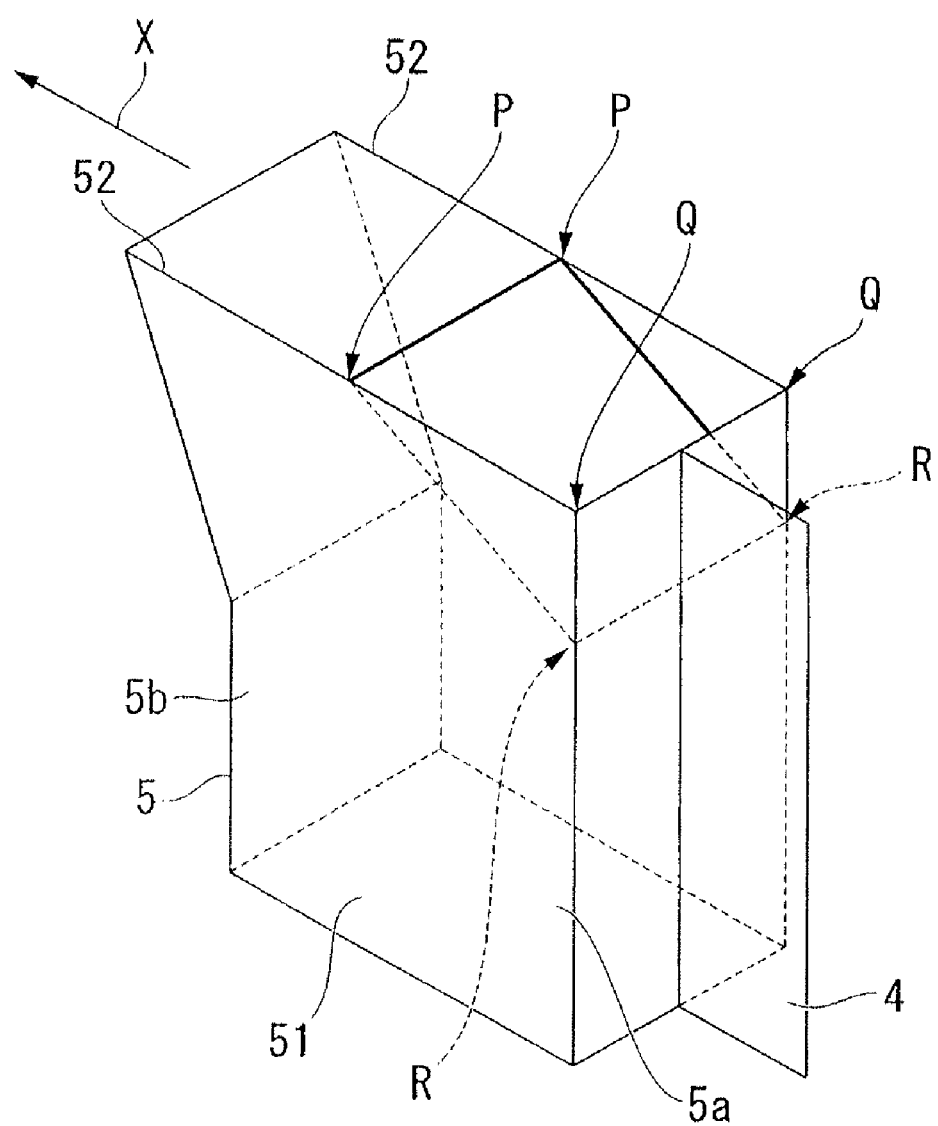
FIG. 14 is a skeletal perspective view when an airbag according to another embodiment is unfolded/expanded.

For example, according to the first and second embodiments described above, the shape of the bag main body part 5 seen in planar view is approximately an oval. However, as shown in FIG. 14, the shape of the bag main body part 5 seen in planar view may be a square. Incidentally, according to FIG. 14, the arrow X indicates the direction in which the bag main body part 5 (the airbag 3) is unfolded.

Further, according to the first and second embodiments described above, the thickness of the airbag at the time of unfolding and expansion is thicker at the upper side compared to the lower side. However, it is also possible to have an equal thickness in the upper and lower sides. Further, the embodiment was an embodiment of an airbag of a side airbag device. This airbag may also be applied to an airbag other than a side airbag device.

INDUSTRIAL APPLICABILITY

The present invention may be applied to a side airbag device equipped on a vehicle, for example, and protecting a passenger from an impact from a side of the vehicle body, as well as to other airbags for protecting passengers.

DESCRIPTION OF REFERENCE SYMBOLS

3 Airbag
10 Base cloth
21 Vent hole
22 Reinforcing cloth
24L, 24R upper side folding part
25L, 25R lower side folding part
26 Upper side connected portion
27 Lower side connected portion
30 Bag body
31 Upper side shape restriction part
32 Lower side shape restriction part
35 Sewing part (Second shape restriction part)
40 Reinforcing cloth
51 Side surface
52 Upper rim
F1 Upper side folding line
F2 Lower side folding line
P Maximum bulging point (First fixed point)
Q, Q2 Second fixed point
R, R2 Tensional force origin

The invention claimed is:

1. An airbag for a vehicle, the airbag formed as a bag body by sewing together a base cloth, wherein
the bag body comprises a main body part having a pair of side surfaces, a base end side, a tip end side, and a sewing part adjacent said base end side, said side surfaces cooperating to provide an upper rim, said bag body being configured so that a direction in which the bag body unfolds expands from the base end side of the bag body to the tip end side thereof and creates a maximum bulging point at the upper rim of the side surfaces, and the bag body is configured such that, as the bag body unfolds a tensional force is created to pull the upper rim of the bag body toward an outer side by forming a tension line extending so as to cross with the direction in which the bag body unfolds, along a side surface of the bag body, from the maximum bulging point to an intersection between the upper rim and the sewing part.

2. An airbag for a vehicle according to claim 1, wherein:
the maximum bulging point defines a first fixed point, an intersection between both side surfaces and a fixed part of the bag body is a second fixed point, and the intersection between the upper rim and the sewing part defines a base point of tensional force, wherein:
compared to a first lineal length connecting the first fixed point to the second fixed point and existing on an imaginary line along the direction in which the bag body unfolds passing through the first fixed point, a second lineal length connecting the first fixed point to the base point of tensional force is set to be longer, thereby the tension line is formed to connect the tensional force origin point and the first fixed point, thereby configuring the tensional force providing mechanism.

3. An airbag for a vehicle according to claim 2, wherein: the base point of tensional force is positioned lower than the second fixed point.

4. An airbag for a vehicle, the airbag formed as a bag body by sewing together a periphery of a polymerized base cloth, wherein
    a pair of folding parts is polymerized, the pair of folding parts being provided on at least towards a side of the base cloth before sewing together, and
    the airbag comprises a connection part formed by sewing together tip ends of the folding part, and a shape restriction part formed by bonding a base part of the folding part along its folding line.

5. An airbag for a vehicle according to claim 4, wherein: the folding part is provided on each of an upper side and a lower side of a base cloth before sewing together, and the connection part and the shape restriction part is provided on respectively each bending part of the upper side and each bending part of the lower side, being polymerized, and wherein a height dimension of the bending part of the upper side is larger than a height dimension of the bending part of the lower side.

6. An airbag for a vehicle according to claim 5, wherein a vent hole is formed at a position at an upper part of the base cloth and oriented toward a front of a direction in which the bag body is unfolded when the bag body has expanded.

7. An airbag for a vehicle according to claim 6, wherein a reinforcing cloth is provided at a peripheral rim of the vent hole.

8. An airbag for a vehicle according to claim 4, comprising a second shape restriction part formed by bonding along a direction extending toward an inner side of the bag body and crossing with respect to the shape restriction part.

9. An airbag for a vehicle according to claim 8, wherein a vent hole is formed at a position at an upper part of the base cloth and oriented toward a front of a direction in which the bag body is unfolded when the bag body has expanded.

10. An airbag for a vehicle according to claim 9, wherein a reinforcing cloth is provided at a peripheral rim of the vent hole.

11. A manufacturing method of an airbag for a vehicle, the manufacturing method comprising:
    a step forming a base cloth which is approximately symmetrically shaped;
    a step bending the base cloth at a central part and sewing together a peripheral rim;
    a step turning over inside-out, a base cloth, the peripheral rim of which has been sewed together; and
    a step bonding along the bending line in a condition in which at least an end of the base cloth being turned over inside-out, is bended to an inner side.

12. A manufacturing method of an airbag for a vehicle according to claim 11, further comprising a step sewing a reinforcing cloth comprising a vent hole to a central part of the base cloth which is approximately symmetrically shaped.

* * * * *